(12) United States Patent
Natsuno et al.

(10) Patent No.: US 8,112,115 B2
(45) Date of Patent: Feb. 7, 2012

(54) PORTABLE BASE STATION DEVICE AND CHARGING METHOD

(75) Inventors: Takeshi Natsuno, Tokyo (JP); Izua Kano, Yokohama (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 486 days.

(21) Appl. No.: 12/294,055

(22) PCT Filed: Mar. 23, 2007

(86) PCT No.: PCT/JP2007/055984
§ 371 (c)(1),
(2), (4) Date: Jan. 16, 2009

(87) PCT Pub. No.: WO2007/119504
PCT Pub. Date: Oct. 25, 2007

(65) Prior Publication Data
US 2009/0177593 A1 Jul. 9, 2009

(30) Foreign Application Priority Data
Mar. 24, 2006 (JP) .................. P2006-083647

(51) Int. Cl.
*H04B 1/38* (2006.01)
(52) U.S. Cl. ........ 455/557; 455/561; 455/405; 455/406; 455/11.1; 455/402.2; 370/315
(58) Field of Classification Search .................. 455/561, 455/461, 424, 560, 404.2, 405, 406, 407, 455/408, 411, 456.1, 456.3, 11, 1; 370/315
See application file for complete search history.

(56) References Cited

U.S. PATENT DOCUMENTS

| | | | |
|---|---|---|---|
| 5,490,284 A | 2/1996 | Itoh et al. | |
| 5,832,378 A | 11/1998 | Zicker et al. | |

(Continued)

FOREIGN PATENT DOCUMENTS

JP  6 311099  4/1994
(Continued)

OTHER PUBLICATIONS

Office Action issued Sep. 27, 2010, in China Patent Application No. 200780010588.7.

(Continued)

*Primary Examiner* — Kent Chang
*Assistant Examiner* — Magdi Elhag
(74) *Attorney, Agent, or Firm* — Oblon, Spivak, McClelland, Maier & Neustadt, L.L.P.

(57) ABSTRACT

A mobile base station device and billing method, which can provide an incentive for use at a specific position, while securing convenience for users, are provided. In a mobile base station device 10, upon installation by an owner, registered user terminal-specific information transmitted from a network N, and installation position information specifying the installation position, are stored. When there is transmission from a portable terminal 30, judgment is made as to whether the user of the portable terminal 30 is a registered user and as to whether transmission is from within a prescribed area; only when these conditions are satisfied, a communication connection is established at a flat rate. By this means, in the mobile base station device 10, an incentive can be provided to users for use in a specific position. Further, billing adjustments are made for use at other than the specific position, but communication service is not completely forbidden, and user convenience is secured.

4 Claims, 9 Drawing Sheets

U.S. PATENT DOCUMENTS

| | | | |
|---|---|---|---|
| 5,943,396 A | 8/1999 | Terashima et al. | |
| 6,253,088 B1 * | 6/2001 | Wenk et al. | 455/462 |
| 7,117,015 B2 * | 10/2006 | Scheinert et al. | 455/561 |
| 7,272,397 B2 * | 9/2007 | Gallagher et al. | 455/436 |
| 7,315,903 B1 * | 1/2008 | Bowden | 709/250 |
| 7,729,697 B2 * | 6/2010 | Scheinert et al. | 455/435.1 |
| 2005/0070283 A1 | 3/2005 | Hashimoto et al. | |
| 2005/0148368 A1 | 7/2005 | Scheinert et al. | |
| 2007/0054668 A1 * | 3/2007 | Scheinert et al. | 455/435.1 |
| 2009/0222669 A1 * | 9/2009 | Huang et al. | 713/182 |

FOREIGN PATENT DOCUMENTS

| | | |
|---|---|---|
| JP | 6 338849 | 12/1994 |
| JP | 2002 10316 | 1/2002 |
| JP | 2005 101820 | 4/2005 |
| JP | 2005 109570 | 4/2005 |
| WO | WO 98/15144 A1 | 4/1998 |
| WO | WO 2004/040938 A1 | 5/2004 |

OTHER PUBLICATIONS

Japanese Office Action issued on Feb. 15, 2011 in corresponding Japanese Application No. P2006-083647 (with an English translation).

Chinese Office Action issued Jun. 9, 2011, in Patent Application No. 200780010588.7 (with English-language translation).

Supplementary European Search Report issued Sep. 14, 2010, in European Patent Application No. 07739425.2.

* cited by examiner

*Fig.3*

| USER NAME | ○○○○ |
|---|---|
| USER ID | 3000019278 |
| ADJACENT PUBLIC BASE STATION 1 | XX SECTOR 1 |
| ADJACENT PUBLIC BASE STATION 2 | YY SECTOR 2 |
| ADJACENT PUBLIC BASE STATION 3 | ZZ SECTOR 3 |

Fig.4

| ADJACENT PUBLIC BASE STATION 1 | XX SECTOR 1 |
|---|---|
| ADJACENT PUBLIC BASE STATION 2 | YY SECTOR 2 |
| ADJACENT PUBLIC BASE STATION 3 | ZZ SECTOR 3 |
| GPS INFORMATION | 34:22:00 |

Fig.5

| TELEPHONE NUMBER | FIXED-RATE TRANSMISSION | RECEIVING PERMITTED | SUPER-USER |
|---|---|---|---|
| 090-XXXX-XXXX | ○ | ○ | ○ |
| 090-YYYY-YYYY | ○ | × | × |
| 090-ZZZZ-ZZZZ | ○ | ○ | × |
| ... | ... | ... | ... |

Fig.6

| BASE STATION ID | OWNER NAME | OWNER ID | ADJACENT PUBLIC BASE STATION 1 | ADJACENT PUBLIC BASE STATION 2 | ADJACENT PUBLIC BASE STATION 3 | GPS INFORMATION |
|---|---|---|---|---|---|---|
| 1 | ○○○○ | 3000019278 | XX SECTOR 1 | YY SECTOR 2 | ZZ SECTOR 3 | 34:22:00 |
| 2 | △△△△ | 4589189191 | ZX SECTOR 1 | YZ SECTOR 1 | XY SECTOR 2 | 35:05:00 |
| ... | ... | ... | ... | ... | ... | ... |

Fig.7

| OWNER ID | OWNER TERMINAL NUMBER | CHILD USER TERMINAL NUMBER 1 | CHILD USER TERMINAL NUMBER 2 | CHILD USER TERMINAL NUMBER 3 |
|---|---|---|---|---|
| 3000019278 | 090-XXXX-XXXX | 090-YYYY-YYYY | 090-ZZZZ-ZZZZ | |
| 4589189191 | 090-aaaa-aaaa | 090-bbbb-bbbb | | |
| ... | ... | ... | ... | ... |

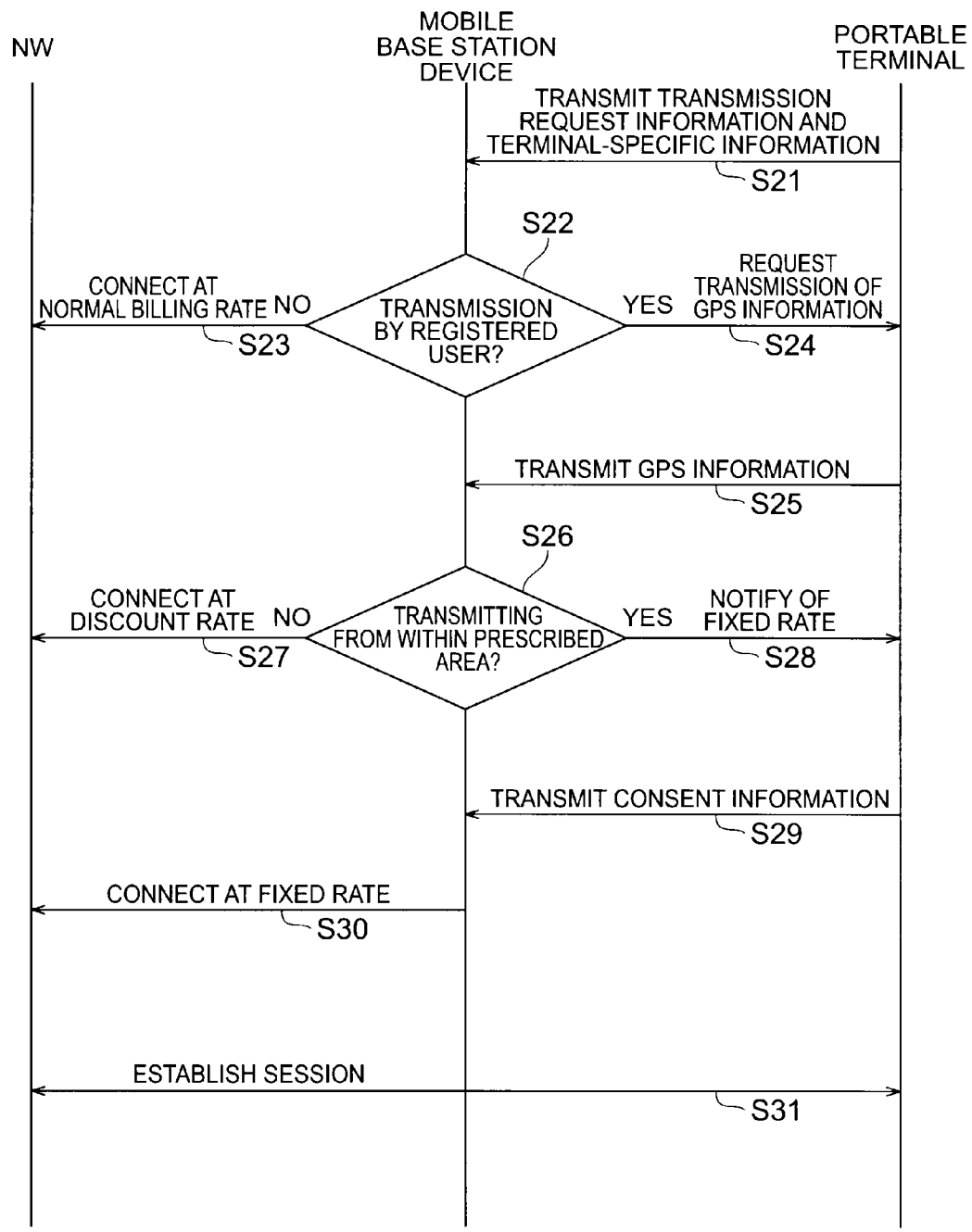

PORTABLE BASE STATION DEVICE AND CHARGING METHOD

TECHNICAL FIELD

This invention relates to a mobile base station device, installed primarily within a home, and to a billing method in such a mobile base station device.

BACKGROUND ART

With the spread of portable terminals in recent years, development of mobile base station devices which can easily be installed as access points for portable terminals has been conducted. As such technology, for example, the wireless telephone system described in Patent Document 1 is an example. In this wireless telephone system of the prior art, by managing access to a home base station based on identification information of portable terminals, communication fees are calculated for each of the connected portable terminals.
Patent Document 1: Japanese Patent Laid-open No. H6-311099

DISCLOSURE OF THE INVENTION

Problems to be Solved by the Invention

If mobile base station devices come into widespread use in homes and various other locations, the area of communication of portable terminals will be broadened, and in addition, in future it can be expected that such devices will function to provide home services connecting household appliances within the home. Hence communication enterprises are studying various designs for communication systems to promote the installation of such devices.

However, because such a base station device is made portable in consideration of the convenience of installation in a home or similar, a user can on occasion carry the base station device outside or to other places. But if a uniform communication service is provided regardless of the location of installation of the base station, the incentive of installation of the base station device in the home or elsewhere is lost, and moreover management of the base station by the communication enterprise becomes difficult. On the other hand, if communication services are completely forbidden merely as a consequence of changing the installation location, there is the problem of diminished convenience to the user.

This invention was devised in light of the above problems, and has as an object the provision of a mobile base station device and billing method which can provide an incentive for use at a specific position, while securing convenience for users.

Means for Solving the Problems

In order to resolve the above problems, a mobile base station device of this invention is a mobile base station device which relays communication between portable terminals and a network, and is characterized in comprising owner information transmission means for transmitting to the network owner-specific information specifying a user who is an owner and installation position information specifying the installation position of the mobile base station device; terminal-specific information reception means for receiving, from the network, registered user terminal-specific information specifying the portable terminals of the owner and of registered users associated with the owner, in response to transmission of user-specific information; information storage means for storing, in association, installation position information and registered user terminal-specific information; transmission source information reception means for receiving transmitting user terminal-specific information specifying one portable terminal together with transmitting position information specifying the transmitting position of transmission request information, when transmission request information indicating a transmission request is received from one portable terminal; user judgment means for judging whether the user of one portable terminal is the registered user, based on registered user terminal-specific information stored in information storage means and on transmitting user terminal-specific information received by the transmission source information reception means; transmitting position judgment means for judging whether the transmitting position of the one portable terminal is within a prescribed area in the environs of the installation position, based on installation position information stored in information storage means and on transmitting position information received by the transmission source information reception means; and billing information generation means for generating billing information relating to communication connection at a billing rate different from a normal rate, when the user of the one portable terminal is judged to be the registered user by the user judgment means, and the transmitting position of the one portable terminal is judged to be within the prescribed area in the environs of the installation position by the transmitting position judgment means.

In the case of this mobile base station device, when the owner installs the device, registered user terminal-specific information transmitted from the network and installation position information specifying the installation position are stored. And, when transmission request information is received from the portable terminal, judgments are made as to whether the user of this portable terminal is the registered user and as to whether transmission is being performed within the prescribed area; billing information different from normal is generated only when both these are satisfied. In the case of this mobile base station device, communication fees can for example be set to a low amount for use of the base station device at a normal installation position (specific position). Hence the registered user can be given an incentive to use the device at a specific position. By this means, management by the communication enterprise of the installation position and similar of the device can be facilitated. Also, billing adjustments are made for use at other than the specific position, but communication service is not completely forbidden, and user convenience is secured.

It is preferable that the installation position information comprise adjacent public base station information indicating a public base station adjacent to the current range of the portable terminal of the owner; that the transmitting position information comprise adjacent public base station information indicating the public base station adjacent to the current range of the one portable terminal; and that the transmitting position judgment means compare each of the adjacent public base station information items, and judge whether the transmitting position of the one terminal is positioned within the prescribed area in the environs of the installation position. In this case, the relation between the installation position of the mobile base station device and the transmitting position of the one portable terminal can be ascertained by simple means.

Further, it is preferable that installation position information comprise GPS information indicating the absolute position of the portable terminal of the owner, that transmitting position information comprise GPS information indicating the absolute position of the one portable terminal, and that the transmitting position judgment means compare each the GPS information items and judge whether the transmitting position of the one terminal is within the prescribed area in the environs of the installation position. In this case, the relation between the installation position of the mobile base station device and the transmitting position of the one portable terminal can be more accurately ascertained.

A billing method of this invention is a method of billing for communication connection fees for a mobile base station device which relays communication between portable terminals and a network, and is characterized in comprising a step in which owner information transmission means transmits, to a network, owner-specific information specifying a user who is an owner and installation position information specifying the installation position of the mobile base station device; a step in which terminal-specific information reception means receives, from the network, registered user terminal-specific information specifying the portable terminals of the owner and of registered users associated with the owner, in response to transmission of user-specific information; a step in which information storage means stores, in association, installation position information and registered user terminal-specific information; a step in which transmission source information reception means, upon receiving transmission request information indicating a transmission request from one portable terminal, receives transmitting user terminal-specific information specifying the one portable terminal and transmitting position information specifying the transmitting position of the transmission request information; a step in which user judgment means judges whether the user of the one portable terminal is the registered user, based on registered user terminal-specific information stored in information storage means and transmitting user terminal-specific information received by the transmission source information reception means; a step in which the transmitting position judgment means judges whether the transmitting position of the one portable terminal is within the prescribed area in the environs of the installation position, based on installation position information stored in the information storage means and on transmitting position information received by the transmission source information reception means; and, a step in which the billing information generation means generates billing information relating to communication connection at a billing rate different from a normal rate, when the user of the one portable terminal is judged to be a registered user by the user judgment means, and the transmitting position of the one portable terminal is judged to be within the prescribed area in the environs of the installation position by the transmitting position judgment means.

In this billing method, communication fees can for example be set to a low amount for use of the base station device at a specific position. Hence the registered user can be given an incentive to use the device at a specific position. By this means, management by the communication enterprise of the installation position and similar of the device can be facilitated. Also, billing adjustments are made for use at other than the specific position, but communication service is not completely forbidden, and user convenience is secured.

Effects of the Invention

By means of a mobile base station device and billing method of this invention, an incentive for use at a specific position can be provided, while securing user convenience.

BRIEF DESCRIPTION OF THE DRAWINGS

FIG. 3 shows an example of information stored in a portable terminal UIM.

FIG. 4 shows an example of installation position information stored in a base station device UIM.

FIG. 5 shows an example of registered user terminal-specific information and attribute information stored in a base station device UIM.

FIG. 6 shows an example of installation position information stored in a user management server.

FIG. 7 shows an example of registered user terminal-specific information stored in a user management server.

FIG. 9 is a sequence diagram showing operation of an information communication system when performing wireless communication with a portable terminal using a mobile base station device.

EXPLANATION OF SYMBOLS

Figure 1:
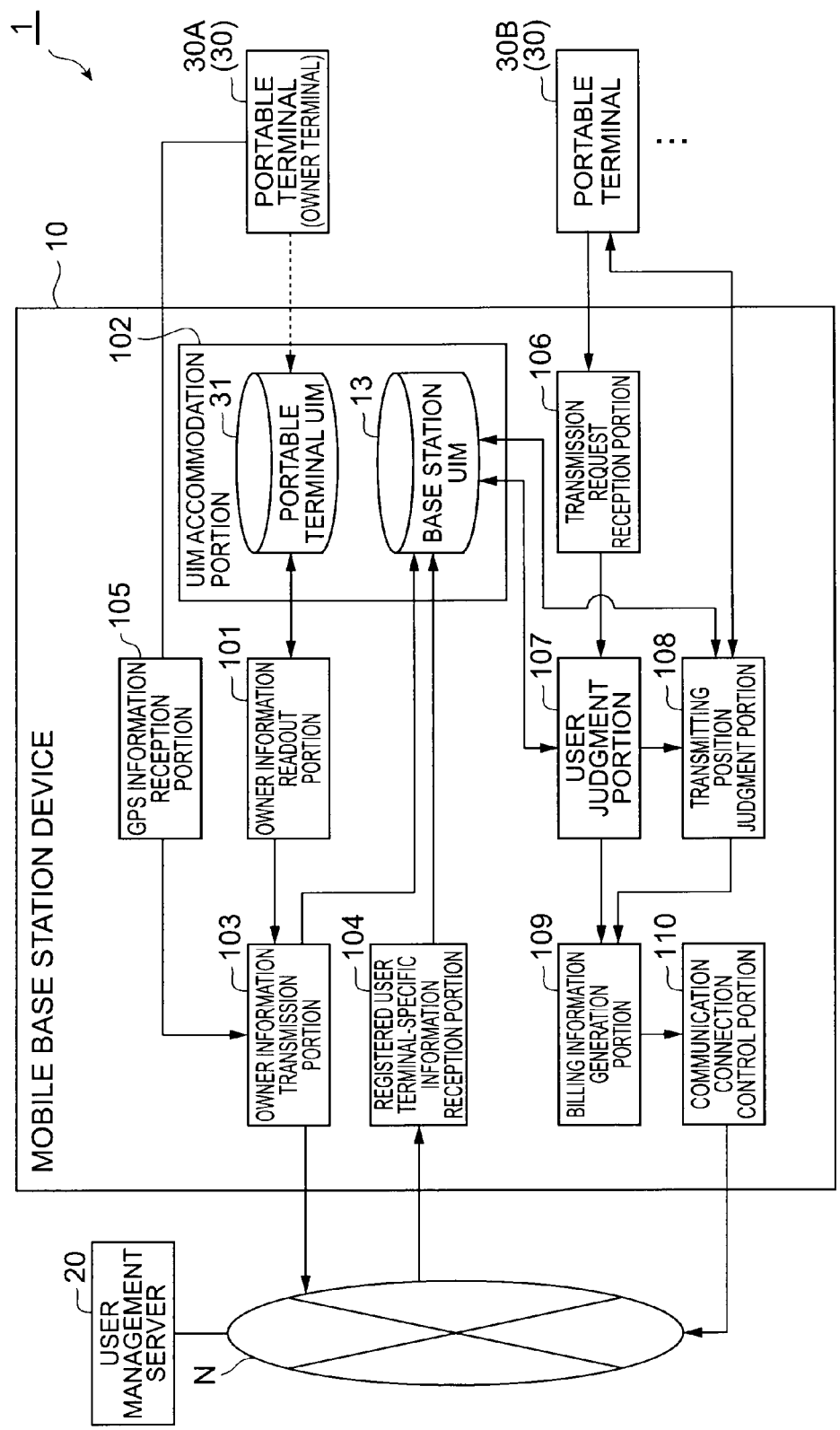
FIG. 1 is a configuration diagram showing one aspect of an information communication system comprising a mobile base station device of the invention.

10 Mobile base station device
13 Base station device UIM (information storage means)
30 Portable terminal
103 Owner information transmission portion
104 Registered user terminal information reception portion
106 Send request reception portion (transmission source information reception means)
107 User judgment portion
108 Sending position judgment portion
109 Billing information generation portion
N Network

BEST MODE TO CARRY OUT THE INVENTION

Below, preferred aspects of a mobile base station device and billing method of this invention are explained in detail, referring to the drawings.

FIG. 1 is a configuration diagram showing one aspect of an information communication system comprising a mobile base station device of the invention. And, FIG. 2 is a perspective view showing in summary the mobile base station device shown in FIG. 1.

As shown in FIG. 1, the information communication system 1 is configured comprising a mobile base station device 10, installed primarily within homes, a network N, to which is connected a user management server 20 managed by a communication enterprise, and portable terminals 30 (30A, 30B, ... ) owned by users. In this system, wireless communication is performed by the portable terminals 30, with the mobile base station device 10 as an access point.

Figure 2:
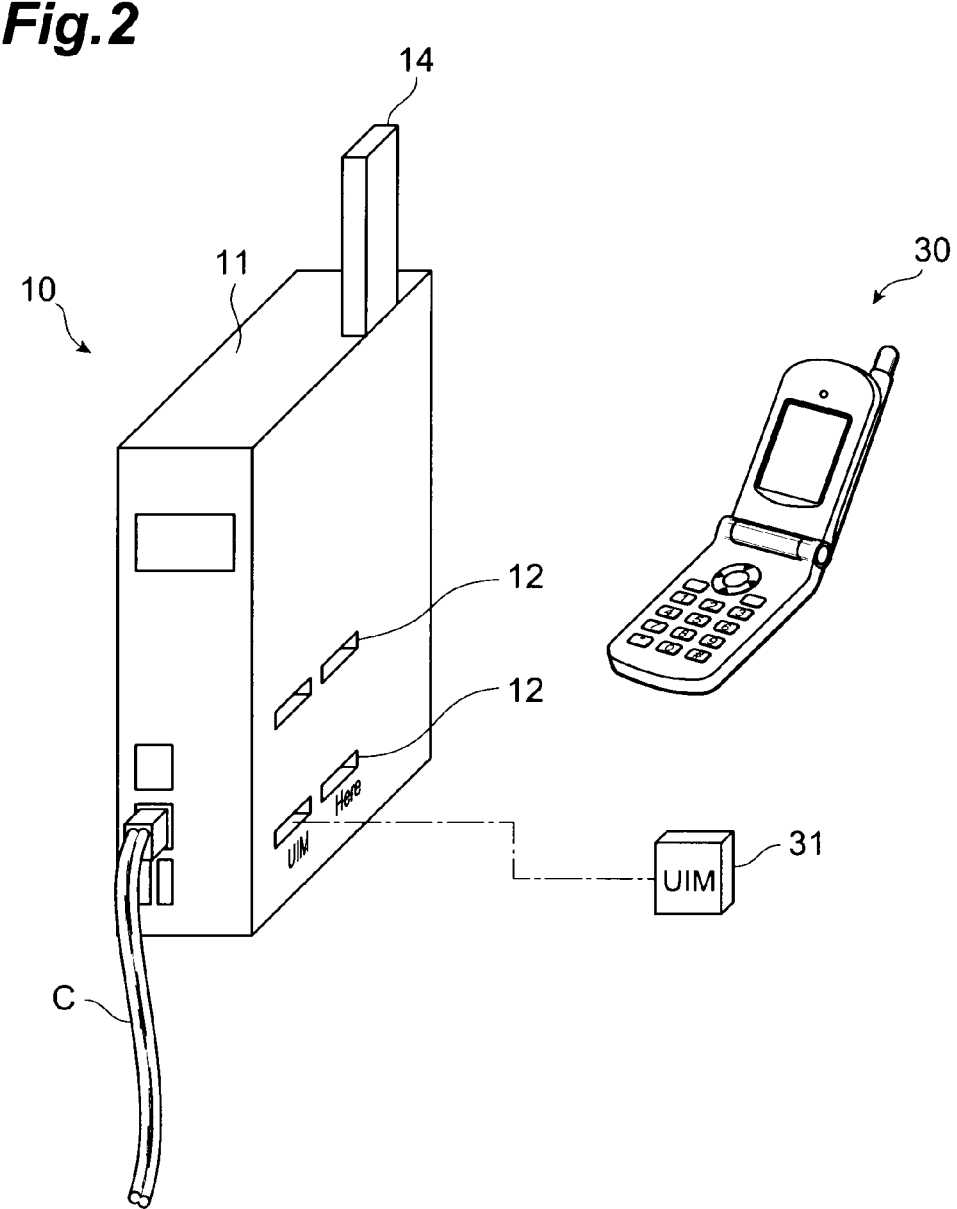
FIG. 2 is a perspective view showing in summary the mobile base station device of FIG. 1.

The mobile base station device 10 and network N are connected to as to enable data communication by for example a WAN cable C for connection with network N (see FIG. 2). The mobile base station device 10 and portable terminals 30 are configured so as to enable wireless data communication. Below, each of these constituent components is explained in detail.

The mobile base station device 10 is a device which relays communication data between portable terminals 30 and the network N. As shown in FIG. 2, the mobile base station device 10 has a housing 11 with a rectangular parallelepiped shape, of a size which takes convenience of installation into consideration (for example, desktop size). Within the housing 11 are accommodated a CPU (Central Processing Unit), memory or other storage device, display device, and similar.

On a side face of the housing 11 are provided a plurality of (in this aspect, four) UIM insertion openings, connected to a UIM accommodation portion 102, described below. UIM (User Identified Module) 31 for portable terminals and a UIM 13 for the base station device (information storage means) can each be inserted into the UIM insertion openings 12. Also, in the upper face of the housing 11 is provided an antenna 14 to transmit and receive wireless signals. The area centered on the antenna 14 and with radius of 5 to 10 m is the range of communication with the portable terminals 30.

As shown in FIG. 1, the mobile base station device 10 has, as functional component elements, an owner information readout portion 101, UIM accommodation portion 102, owner information transmission portion (owner information transmission means) 103, registered user terminal-specific information reception portion (terminal-specific information reception means) 104, GPS information reception portion 105, transmission request reception portion (transmission source information reception means) 106, user judgment portion (user judgment means) 107, transmitting position judgment portion (transmitting position judgment means) 108, billing information generation portion (billing information generation means) 109, and communication connection control portion 110.

The owner information readout portion 101 is a portion which performs readout of information from the portable terminal UIMs accommodated by the UIM accommodation portion 102. More specifically, in the owner information readout portion 101, when the portable terminal UIM 31 of a portable terminal 30A (hereafter called the "owner terminal 30A") owned by a user (hereafter called the "owner") making settings in the mobile base station device 10 is accommodated by the UIM accommodation portion 102, owner-specific information specifying the owner, and adjacent public base station information indicating a public base station adjacent to the current range of the owner terminal 30A, are both read out from the portable terminal UIM 31.

FIG. 3 is an example of information stored in a portable terminal UIM 31. In the example shown in FIG. 3, as owner-specific information, the username of the user, "OOOO", and the user ID, "300019278", are stored. As adjacent public base station information, the three base station information items "XX sector 1", "YY sector 2", and "ZZ sector 3" are stored. The owner information readout portion 101 outputs the readout owner-specific information and adjacent public base station information to the owner information transmission portion 103.

The owner information transmission portion 103 is a portion which transmits, to the network N, owner-specific information and adjacent public base station information received from the owner information transmission portion 103. The owner information transmission portion 103, when the device 10 is installed, also receives GPS information indicating the absolute position of the owner terminal 30A from the GPS information reception portion 105, and transmits the information to the network N. And, the owner information transmission portion 103 replicates received adjacent public base station information and GPS information, and stores the information in the base station device UIM 13.

The registered user terminal-specific information reception portion 104 is a portion which receives registered user terminal-specific information, specifying portable terminals of the owner and of registered users registered in association with the owner in the user management server 20, as well as attribute information for each of the registered users. The registered user terminal-specific information reception portion 104 stores the received information items in the base station device UIM 13.

FIG. 4 shows an example of information stored in the base station device UIM 13 by the owner information transmission portion 103. In the example shown in FIG. 4, the adjacent public base station 1 "XX sector 1", adjacent public base station 2 "YY sector 2", adjacent public base station 3 "ZZ sector 3", and the GPS information "34:22:00" of the owner terminal 30A at the time of installation of the device 10, are stored as installation position information specifying the installation position of the mobile base station device 10.

FIG. 5 shows an example of information stored in the base station device UIM 13 by the registered user terminal-specific information reception portion 104. In the example shown in FIG. 5, information indicating whether sending is at a flat rate, whether receiving is permitted, and whether a user is a super-user (a user given rights to modify attribute information), is stored as attribute information for each user in association with registered user terminal-specific information (the telephone number of the terminal).

That is, in the example of FIG. 5, in association with the telephone number "090-XXXX-XXXX" of the owner terminal are stored values "O" for whether sending is at a flat rate, "O" for whether receiving is permitted, and "O" for super-user status. And, in association with the telephone number "090-YYYY-YYYY" of a portable terminal (child user terminal) of a child user (for example, in the family of the owner) registered by the owner, are stored values "O" for whether sending is at a flat rate, "X" for whether receiving is permitted, and "X" for super-user status. And, in association with the telephone number "090-ZZZZ-ZZZZ" of a separate child user terminal are stored the values "O" for whether sending is at a flat rate, "O" for whether receiving is permitted, and "X" for super-user status.

The GPS information reception portion 105 is a portion which receives GPS information transmitted from the owner terminal 30A. The GPS information reception portion 105 outputs received GPS information to the owner information transmission portion 103.

The transmission request reception portion 106 is a portion which receives transmission request information, indicating transmission requests, from a portable terminal (one portable terminal) 30B within the communication area of the mobile base station device 10. This transmission request reception portion 106 receives, together with transmission request information, transmitting user terminal-specific information (a telephone number) specifying the portable terminal 30B, and GPS information (transmitting position information) specifying the absolute position of transmission.

The user judgment portion 107 is a portion which judges whether the user of a portable terminal 30B is a registered user, based on registered user terminal-specific information stored in the base station device UIM 13, and on transmitting user terminal-specific information for the portable terminal 30B received by the transmission request reception portion 106. When the telephone number of the portable terminal 30B received from the transmission request reception portion 106 coincides with any one telephone number of registered users stored in the base station device UIM 13, the user judgment portion 107 outputs judgment result information, indicating that the sender is a registered user, to the transmitting position judgment portion 108.

On the other hand, when the telephone number of the portable terminal 30B does not coincide with any telephone number of registered users stored in the base station device UIM 13, the user judgment portion 107 outputs judgment result information, indicating that the sender is not a registered user, to the billing information generation portion 109.

The transmitting position judgment portion 108 is a portion which judges whether the transmitting position of the portable terminal 30B is within a prescribed area centered on the installation position of the mobile base station device 10. More specifically, upon receiving judgment result information from the user judgment portion 107 indicating that the sender is a registered user, the transmitting position judgment portion 108 transmits GPS information transmission request information requesting transmission of GPS information to the portable terminal 30B, and receives GPS information transmitted from the portable terminal 30B in response.

The transmitting position judgment portion 108 compares the GPS information stored in the base station device UIM 13 with the GPS information of the portable terminal 30B received by the transmission request reception portion 106, and calculates the distance between the two points which are the transmitting position of the portable terminal 30B and the installation position of the mobile base station device 10. If the transmitting position judgment portion 108 judges that the transmitting position of the portable terminal 30B is within the prescribed area from the installation position of the mobile base station device 10, the transmitting position judgment portion 108 notifies the portable terminal 30B that communication connection will be performed at a flat rate. Then, upon receiving consent information from the portable terminal 30B indicating consent to communication connection at the flat rate, the transmitting position judgment portion 108 outputs this consent information to the billing information generation portion 109. If on the other hand the transmitting position judgment portion 108 judges that the transmitting position of the portable terminal 30B is not within the prescribed area from the installation position of the mobile base station device 10, judgment result information indicating this judgment result is output to the billing information generation portion 109.

The billing information generation portion 109 is a portion which generates billing information related to communication connection fees for portable terminals 30B, based on judgment results of the user judgment portion 107 and transmitting position judgment portion 108. Upon receiving judgment result information from the user judgment portion 107 indicating that a sender is not a registered user, the billing information generation portion 109 generates billing information based on a normal billing rate (for example, 20 yen per minute).

Further, upon receiving judgment result information from the transmitting position judgment portion 108 indicating that the transmitting position of the portable terminal 30B is not within the prescribed area from the installation position of the mobile base station device 10, the billing information generation portion 109 generates billing information based on a discount rate, lower than the normal billing rate (for example, 10 yen per minute). And, upon receiving consent information from the transmitting position judgment portion 108, the billing information generation portion 109 generates billing information based on a flat rate lower than the above billing rate (for example, 10 yen per transmission). The billing information generation portion 109 outputs the generated billing information to the communication connection control portion 110.

The communication connection control portion 110 is a portion which controls communication connections with the network N. The communication connection control portion 110 transmits billing information received from the billing information generation portion 109 to the network N, and establishes sessions between portable terminals 30B and the network N.

Next, the user management server 20 is explained. The user management server 20 is a server which manages subscriber information and similar for users using the data communication system 1, and physically is a computer system comprising a CPU, memory, communication interface, hard disk drive or other storage portion, display portion, and similar.

This user management server 20 manages, for each user, installation position information transmitted from mobile base station devices 10 and registered user terminal-specific information. More specifically, the user management server 20 receives owner-specific information and adjacent public base station information from a mobile base station device 10, and performs user authentication using the owner-specific information. After completing user authentication, registered user terminal-specific information is transmitted to the mobile base station device 10, and in addition a test call to the owner terminal 30A is transmitted. In response to the transmitted test call, the user management server 20 receives GPS information transmitted from the mobile base station device 10, and stores this GPS information in association with the adjacent public base station information.

FIG. 6 shows an example of installation position information stored in the user management server 20. In the example shown in FIG. 6, as installation position information for the mobile base station device 10, the base station ID "1", owner name "OOOO", owner ID "3000019278", adjacent public base station 1 "XX sector 1", adjacent public base station 2 "YY sector 2", adjacent public base station 3 "ZZ sector 3", and GPS information "34:22:00", are stored in association. Also, as installation position information for another mobile base station device, the base station ID "2", owner name "ΔΔΔΔ", owner ID "4589189191", adjacent public base station 1 "ZX sector 1", adjacent public base station "YX sector 1", adjacent public base station 3 "XY sector 2", and GPS information "35:05:00", are stored in association.

FIG. 7 shows an example of registered user terminal-specific information stored in the user management server 20. In the example shown in FIG. 7, the owner ID "300019278", owner terminal number "090-XXXX-XXXX", child user terminal number 1 "090-YYYY-YYYY", and child user terminal number 2 "090-ZZZZ-ZZZZ", are stored. Also, for another owner as well, the owner ID "4589189191", owner terminal number "090-aaaa-aaaa", and child user terminal number 1 "090-bbbb-bbbb", are stored.

Next, operation of a data communication system 1 comprising a mobile base station device 10 having the above-described configuration is explained.

Figure 8:
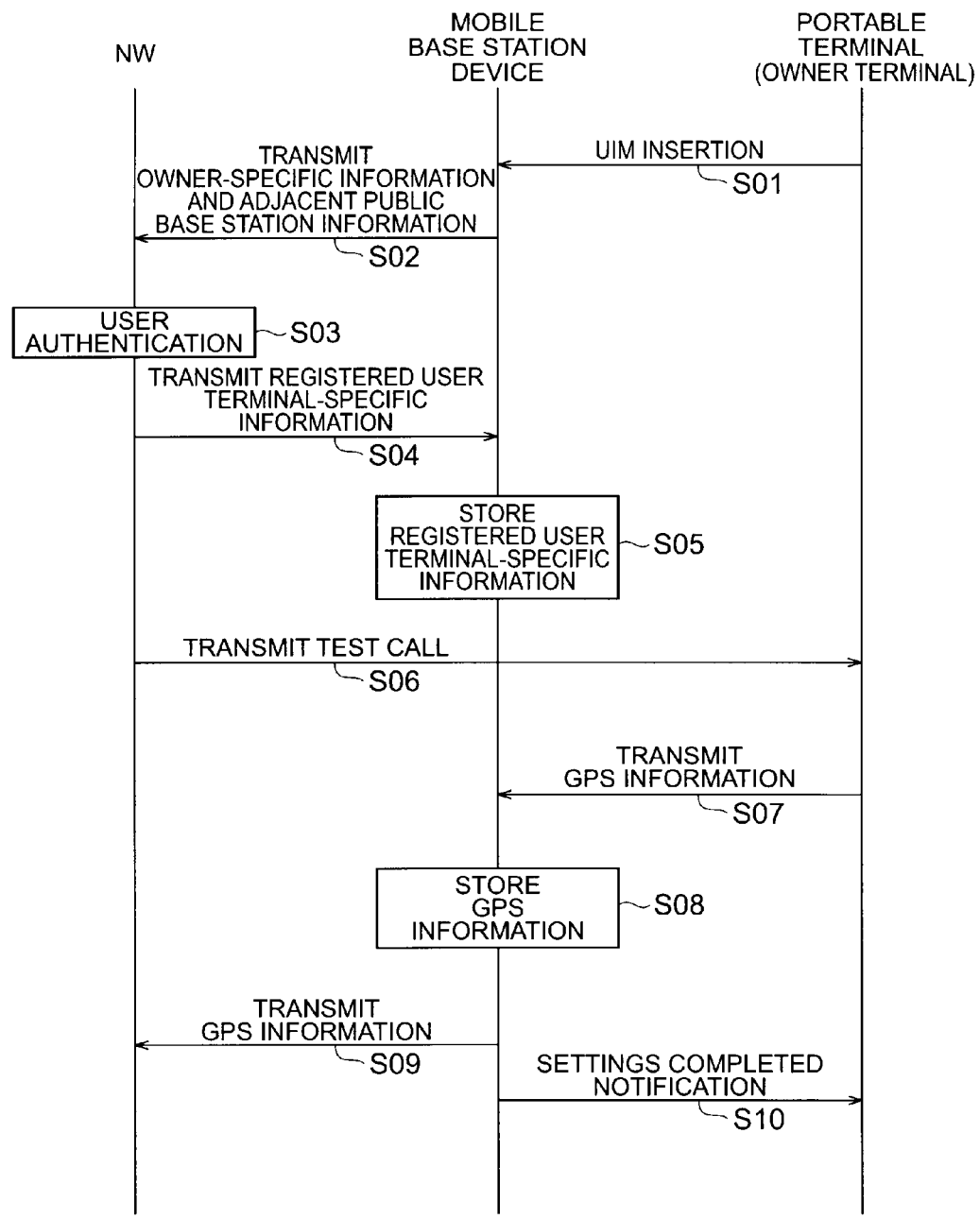
FIG. 8 is a sequence diagram showing operation of an information communication system when installing a mobile base station device.

First, operation when installing the mobile base station device 10 is explained, referring to the sequence diagram of FIG. 8. The user (owner) turns on the power supply of the mobile base station device 10, and inserts the portable terminal UIM 31 of the owner terminal 30A into a UIM insertion opening 12 (step S01), and owner-specific information and adjacent public base station information read out from the portable terminal UIM 31 are transmitted to the network N (step S02).

The user management server 20 uses the received owner-specific information to perform user authentication (step S03), and after completion of user authentication, transmits the registered user terminal-specific information to the mobile base station device 10 (step S04). The mobile base station device 10 stores the received registered user terminal-specific information, together with adjacent public base station information, in the base station device UIM 13 (step S05). Also, a test call is transmitted from the user management server 20 to the owner terminal 30A (step S06), and in response, GPS information is transmitted from the owner terminal 30A to the mobile base station device 10 (step S07).

The mobile base station device 10 stores the received GPS information in the base station device UIM 13 (step S08), and also transmits the GPS information to the network N (step S09). Finally, setting completion notification is sent from the mobile base station device 10 to the owner terminal 30A (step S10), and installation of the mobile base station device 10 is completed. The processing from step S01 to step S10 is repeated each time the power supply of the mobile base station device 10 is turned off, and then turned on.

Next, operation when performing wireless communication with a portable terminal 30 using the mobile base station device 10 is explained, referring to the sequence diagram shown in FIG. 9. First, as a result of a prescribed operation by the user, transmission request information and terminal-specific information are transmitted from the portable terminal 30B to the mobile base station device 10 (step S21). The mobile base station device 10 references the base station device UIM 13 based on the received terminal-specific information, confirms the user attribute information of the portable terminal 30B, and judges whether the user is a registered user (step S22).

When the user of the portable terminal 30B is not a registered user, the mobile base station device 10 performs processing for connection of the portable terminal 30B to the network N based on the normal billing rate (step S23), and establishes a session (step S31). When the user of the portable terminal 30B is a registered user, a request for GPS information is sent from the mobile base station device 10 to the portable terminal 30B (step S24), and in response GPS information is transmitted from the portable terminal 30B to the mobile base station device 10 (step S25).

Based on the received GPS information, the mobile base station device 10 references the adjacent public base station information and GPS information stored in the base station device UIM 13, and judges whether the portable terminal 30B is transmitting from a prescribed area centered on the installation position of the mobile base station device 10, set in steps S01 to S10 (step S26). If the portable terminal 30B is not transmitting from within the prescribed area, the mobile base station device 10 performs processing to connect the portable terminal 30B to the network N based on a discount rate (step S27), and establishes a session (step S31).

If the portable terminal 30B is transmitting from within the prescribed area, the mobile base station device 10 notifies the portable terminal 30B of communication connection at a flat rate (step S28). And, when consent information is received by the mobile base station device 10 from the portable terminal 30B (step S29), the mobile base station device 10 performs processing to connect the portable terminal 30B to the network N based on the flat rate (step S30), and establishes a session (step S31).

As explained above, in the mobile base station device 10, when the device 10 is installed by the owner, registered user terminal information transmitted from the network N and installation position information specifying the installation position (adjacent public base station information and GPS information for the owner terminal 30A) are stored. And, upon receiving transmission request information from a portable terminal 30B, the mobile base station device 10 judges whether the user of this portable terminal 30B is a registered user, and judges whether transmission is from within the prescribed area, and when these conditions are satisfied, generates billing information based on a flat rate, so that the communication connection fee is lower than normal.

In this way, in the mobile base station device 10, billing information is generated in a flat rate mode at a lower rate than normal for use of the device 10 at the normally installed position (specific position), so that registered users can be provided with an incentive for use at the specific position. By this means, management of the installation position and similar of the device 10 by the communication enterprise can be facilitated. Also, at other than the specific position, communication services can be used at a discount rate or at the normal billing rate, so that convenience for users is also secured.

Further, in the mobile base station device 10, installation position information includes GPS information indicating the absolute position of the owner terminal 30A, and transmitting position information includes GPS information indicating the absolute positions of portable terminals 30B. The transmitting position judgment portion 108 compares the GPS information, and judges whether the transmitting position of a portable terminal 30B is within a prescribed area centered on the installation position. By this means, in the mobile base station device 10, the relation between the installation position of the device 10 and the transmitting position of the portable terminal 30B can be accurately ascertained, and billing rate switching can be performed appropriately.

This invention is not limited to the above aspects. For example, communication connection fee settings are not limited to the above-described flat rate, and need only be lower than normal when it is judged that the user is a registered user and moreover that sending is from within a prescribed area centered on the installation position. Further, when there is no GPS information response from the owner terminal 30A to the test call or in other cases, in place of GPS information, the transmitting position of the portable terminal 30B may be judged based on only the adjacent public base station information. In this case, even when the owner terminal 30A is outside the communication area of the network N, installation of the mobile base station device 10 can be performed.

INDUSTRIAL APPLICABILITY

By means of a mobile base station device and billing method of this invention, an incentive for use at a specific position can be provided, while securing convenience for users.

The invention claimed is:

1. A mobile base station device, which relays communication between portable terminals and a network, comprising:
an owner information transmission portion that transmits to said network owner-specific information specifying a user who is an owner of a portable terminal as well as installation position information specifying a specific installation position of the mobile base station device;
a terminal-specific information reception portion that receives, from an external device in said network, in response to transmission of said owner-specific information, registered user terminal-specific information specifying portable terminals of said owner and portable terminals of registered users that are registered in association with the owner-specific information in the external device in said network;
an information storage portion that stores, in association, said installation position information replicated by said owner information transmission portion and said registered user terminal-specific information;

a transmission source information reception portion that receives terminal-specific information specifying one portable terminal and transmission request information indicating a transmission request from said one portable terminal, and receives transmitting position information specifying a specific transmitting position of said one portable terminal, wherein the transmitting position of said one portable terminal is a position of said one portable terminal taken after the installation position of the mobile base station device has been established;

a user judgment portion that judges whether the user of said one portable terminal is a registered user, based on said registered user terminal-specific information stored in said information storage portion and on said transmitting user terminal-specific information received by said transmission source information reception portion;

a transmitting position judgment portion that judges whether the transmitting position of said one portable terminal is within a prescribed area in the environs of said installation position, based on said installation position information stored in said information storage portion and on said transmitting position information received by said transmission source information reception portion; and a billing information generation portion that generates billing information relating to communication connection at a billing rate different from a normal rate, when the user of said one portable terminal is judged to be a registered user by said user judgment portion, and the transmitting position of said one portable terminal is judged to be within a prescribed area in the environs of the installation position by said transmitting position judgment portion.

2. The mobile base station device according to claim 1, wherein said installation position information comprises adjacent public base station information indicating a public base station adjacent to the current range of the portable terminal of said owner;

said transmitting position information comprises adjacent public base station information indicating the public base station adjacent to the current range of said one portable terminal; and said transmitting position judgment portion compares each of said adjacent public base station information items, and judges whether the transmitting position of said one terminal is positioned within a prescribed area in the environs of said installation position.

3. The mobile base station device according to claim 1, said installation position information comprises GPS information indicating the absolute position of the portable terminal of said owner, said transmitting position information comprises GPS information indicating the absolute position of said one portable terminal, and said transmitting position judgment portion compares each of said GPS information items and judges whether the transmitting position of said one terminal is within a prescribed area in the environs of said installation position.

4. A billing method for a mobile base station device which relays communication between portable terminals and a network, the method comprising:

a step in which an owner information transmission portion of the mobile base station device transmits, to said network, owner-specific information specifying a user who is an owner of a portable terminal as well as installation position information specifying the specific installation position of the mobile base station device;

a step in which a terminal-specific information reception portion of the mobile base station device receives, from an external device in said network, in response to transmission of said owner-specific information, registered user terminal-specific information specifying portable terminals of said owner and portable terminals of registered users that are registered in association with the owner-specific information in the external device in said network;

a step in which an information storage portion of the mobile base station device stores, in association, said installation position information replicated by said owner information transmissions portion and said registered user terminal-specific information;

a step in which a transmission source information reception portion of the mobile base station device, upon receiving transmission request information indicating a transmission request from one portable terminal, receives transmitting user terminal-specific information specifying said one portable terminal;

a step in which user a judgment portion of the mobile base station device judges whether the user of said one portable terminal is a registered user, based on said registered user terminal-specific information stored in said information storage portion and on said transmitting user terminal-specific information received by said transmission source information reception portion;

a step in which the transmission source information reception portion receives transmitting position information specifying the specific transmitting position of said one portable terminal, wherein the transmitting position of said one portable terminal is a position of said one portable terminal taken after the installation position of the mobile base station device has been established;

a step in which a transmitting position judgment portion of the mobile base station device judges whether the transmitting position of said one portable terminal is within a prescribed area in the environs of said installation position, based on said installation position information stored in said information storage portion and on said transmitting position information received by said transmission source information reception portion; and a step in which a billing information generation portion of the mobile base station device generates billing information relating to communication connection at a billing rate different from a normal rate, when the user of said one portable terminal is judged to be a registered user by said user judgment portion, and the transmitting position of said one portable terminal is judged to be within a prescribed area in the environs of said installation position by said transmitting position judgment portion.

* * * * *